United States Patent [19]

Thomas

[11] 4,067,140
[45] Jan. 10, 1978

[54] MULCH AND PROCESS OF MAKING SAME

[76] Inventor: John C. Thomas, 105 Kathy Drive, Clinton, Mich. 49236

[21] Appl. No.: 674,555

[22] Filed: Apr. 7, 1976

[51] Int. Cl.² .............................................. A01G 7/00
[52] U.S. Cl. ........................................... 47/9; 239/77
[58] Field of Search ............... 47/9, 58; 427/212, 395; 428/537; 162/158, 179; 239/77

[56] References Cited

U.S. PATENT DOCUMENTS

| | | | |
|---|---|---|---|
| 1,871,050 | 8/1932 | Eveland | 47/9 |
| 1,962,806 | 6/1934 | Clapp | 47/9 |
| 2,699,629 | 1/1955 | Wandel | 47/9 |
| 3,017,720 | 1/1962 | Busch | 47/58 |
| 3,091,436 | 5/1963 | Finn | 47/9 X |
| 3,125,294 | 3/1964 | Lill | 47/9 X |
| 3,214,866 | 11/1965 | Halleck | 47/58 |
| 3,218,149 | 11/1965 | Sproull et al. | 47/9 X |

FOREIGN PATENT DOCUMENTS

| | | | |
|---|---|---|---|
| 1,033,186 | 6/1966 | United Kingdom | 47/9 |

Primary Examiner—Robert E. Bagwill
Attorney, Agent, or Firm—Barnes, Kisselle, Raisch & Choate

[57] ABSTRACT

A mulch having finely divided fibers of paper coated with a wetting agent and preferably dyed a pleasing color such as green. To produce the mulch, finely divided fibers of paper are coated with a mixture of a solvent or carrier such as water, a wetting agent, and a dye. The finely divided fibers of paper are contacted with the mixture such as by tumbling the fibers of paper while spraying the mixture into the drum.

14 Claims, 2 Drawing Figures

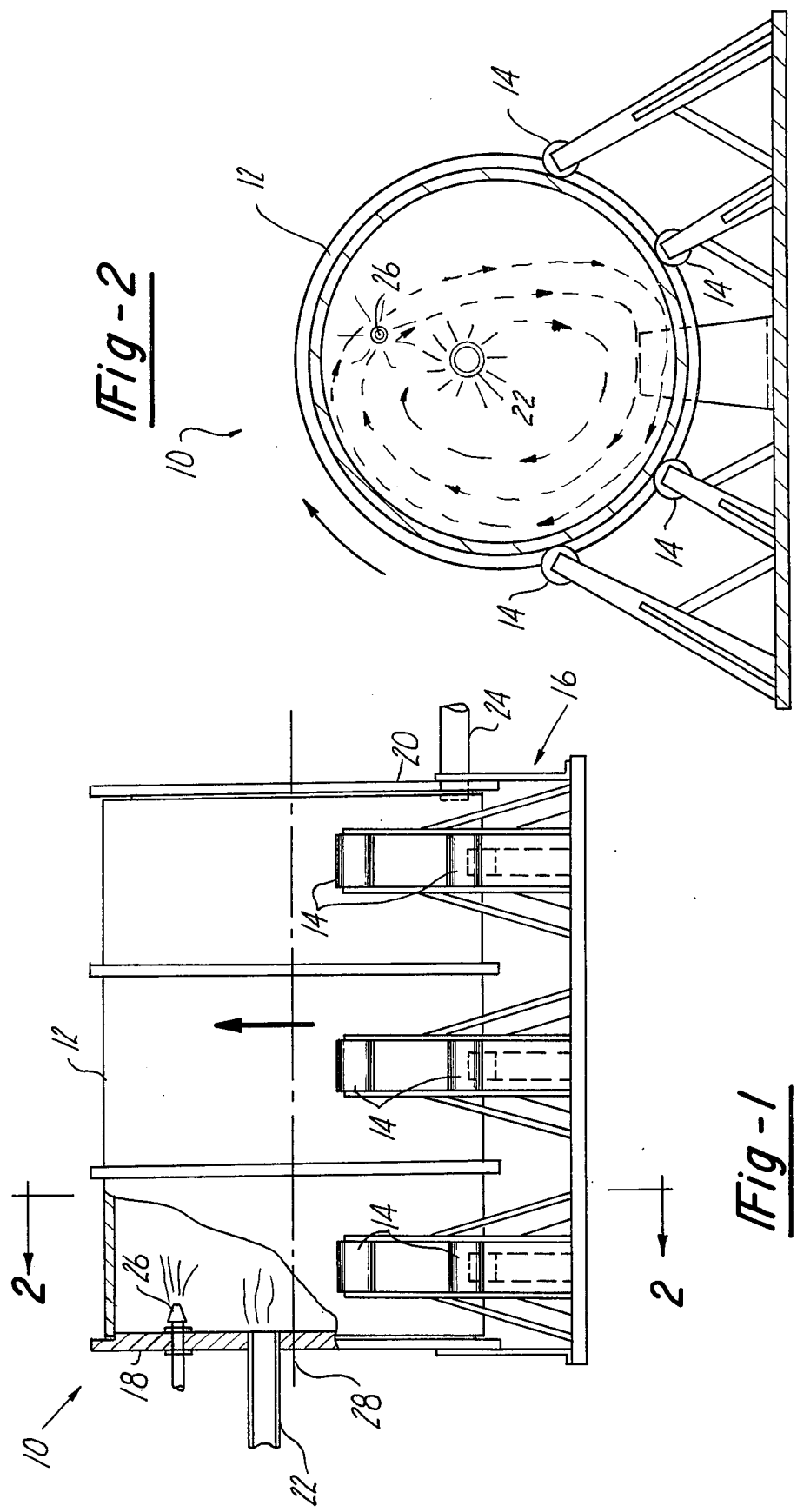

MULCH AND PROCESS OF MAKING SAME

This invention relates to materials for covering and/or mixing with soil and more particularly to a mulch for soil and a process of making such a mulch.

A mulch of sawdust or finely divided chips of wood has been previously spread over soil to provide a protective covering, reduce evaporation, retain heat in the soil, promote germination of seeds such as grass seed, retard the growth of weeds, and enrich the soil. Such a mulch of sawdust or wood chips has been previously applied to the soil by mixing the mulch with water and spraying a stream of the mixture of mulch and water onto the soil. Grass seed and fertilizer have also been added to the mixture of mulch and water and the entire mixture sprayed onto the soil to simultaneously scatter or sow the grass seed upon the soil, provide fertilizer and moisture for the grass seed, and provide a layer of mulch retaining moisture and heat and enhancing germination of the grass seed. The Finn Equipment Company of 2525 Duck Creek Road, Cinn., Ohio 45208 sells suitable apparatus under the tradenames Finn Super Hydroseeder and Finn Titan Hydroseeder for discharging a stream of a mixture of mulch and water and, if desired, grass seed and fertilizer, onto the soil to provide a substantially uniform layer of mulch on the soil.

In the present invention a mulch is produced by coating a quantity of finely divided fibers of paper with a wetting agent. Preferably the wetting agent is mixed with a liquid or solvent such as water and contacted with the fibers of paper by spraying the liquid mixture into a rotating drum in which the fibers of paper are tumbled. Preferably, the fibers of paper are also contacted with a dye to provide paper mulch with a pleasing color such as green. The fibers of paper absorb the liquid mixture thereby coating the fibers of paper with the wetting agent which increases the ability of the paper mulch to be mixed with a suspended in water so that a mixture of paper mulch and water can be discharged in a stream onto soil with a suitable apparatus such as that produced by the Finn Equipment Company.

Objects of this invention are to provide a mulch of paper having improved capabilities for retarding erosion, retaining moisture, retaining heat, and enhancing germination and which can be mixed with and suspended in water for application onto soil by spraying and is less expensive than a mulch of sawdust or finely divided wood chips suitable for mixing with water and spraying onto soil. Further objects of this invention are to provide a process of producing such a mulch of paper which process is efficient, economical, reliable and may be easily carried out to mass produce such a mulch of paper.

These and other objects, features, and advantages of this invention will be apparent from the following detailed description, appended claims, and accompanying drawing in which:

FIG. 1 is a side view with portions broken away of a contact chamber which can be used in carrying out the process of this invention.

FIG. 2 is a sectional view on line 2—2 of FIG. 1.

Finely divided fibers of paper for producing mulch in accordance with this invention can be made by reducing or fiberizing used newsprint and wastepaper in a hammer mill. Preferably, such fibers of paper are produced from wastepaper rather than used newsprint which is substantially more expensive than wastepaper. The term wastepaper means used paper such as computer print out paper, computer punch cards, stationary paper, bond paper, writing paper, letter paper, copy paper, onionskin, note paper, manila paper, ledger paper, adding machine tapes, writing paper, wrapping paper, drawing paper, blueprint paper, cardboard, corrugated cardboard, paperboard, and other similar paper which has been used. Such paper is typically used for commercial, business, correspondence or other purposes.

At least 90 percent by weight of such finely divided fibers of paper should have a maximum fiber lineal dimension or length not greater than about 1 inch and preferably not greater than about 0.50 of an inch. One way of determining whether the length of at least 90 percent by weight of a sample of finely divided fibers of paper do not exceed the desired maximum length is to weigh the sample, then sift it through a suitable sieve, and then weigh the fibers, if any, remaining on the sieve. When sifting the fibers through a sieve, it is necessary to apply some force or pressure to the fibers to cause them to pass through the sieve such as by wiping the fibers with a doctor blade or wire bail. Such fibers of paper have been produced by running wastepaper through three stages of hammer milling. In the first stage, wastepaper is passed through an open grate hammer mill and in the second stage, the partially fiberized wastepaper from the first hammer mill is run through a second hammer mill with a screen having holes 1 inch in diameter. In the third stage, the partially fiberized wastepaper from the second mill is run through a third hammer mill with a screen having holes five-sixteeth of an inch in diameter.

In accordance with this invention, the finely divided fibers of used newprint and/or wastepaper are coated or contacted with a wetting agent so that the fibers of the resulting paper mulch can be mixed with and suspended in water to provide a mixture which can be applied onto soil by a jet or stream of the mixture depositing a layer of the mulch on the soil. It is believed that mulch made from finely divided fibers of used newprint and/or wastepaper can be rendered capable of being mixed with and suspended in water by contacting and coating the fibers with a quantity of anionic or ethoxylated surfactants or wetting agents in the range of 0.007 to 0.042 percent and preferably in the range of 0.025 to 0.035 percent by weight of dry finely divided fibers of paper. A suitable wetting agent is Turgitol detergent sold by Chemserve Corporation of 9,505 Copeland St., Detroit, Mich. To provide the mulch with an eye appealing color it is also preferred to mix a quantity of a water soluble aniline dye in the solution or mixture of water and wetting agent. In practice, a quantity of water soluble green dye No. 1295 sold by Chemserve Corporation of Detroit, Mich. in the range of 0.03 to 0.18 percent and preferably 0.10 to 0.12 percent by weight of the dry fibers of paper has proved to be satisfactory to dye the fibers of the mulch a dark green color.

The finely divided fibers of paper can be satisfactorily contacted and coated with the wetting agent and dye by spraying a liquid mixture of wetting agent, dye, and a liquid carrier or solvent such as water into a blending device such as a rotating drum in which finely divided fibers of paper are being tumbled. The quantity of water used as a carrier or solvent for the wetting agent and dye is not critical and a quantity of water in the range of 10 to 65 percent and preferably 30 to 40 percent by weight of the wetted fibers of paper (the water plus dry fibers of paper by weight) is believed to be satisfactory. In practice, a satisfactory ratio by weight for such a mixture is one part of Turgitol wetting agent, four parts of No. 1295 green dye, and 1595 parts of water. It is believed that less dye is required to color the fibers of paper when the fibers have been previously or are simultaneously contacted with the wetting agent than would be required if the fibers were not coated with any wetting agent until after the fibers were dyed.

FIGS. 1 and 2 illustrate a suitable chamber 10 for contacting the finely divided fibers of paper with the liquid mixture of water, wetting agent, and dye in which a drum 12 is supported by rollers 14 carried by a platform 16 for rotating the drum with respect to fixed end walls 18 and 20 also carried by platform 16. Finely divided fibers of paper are injected into one end of drum 12 through a tube 22 extending through wall 18 and are removed from the other end of drum 12 through a tube 24 extending through wall 20 adjacent the bottom of the drum. The liquid mixture of water, wetting agent, and dye is sprayed into drum 12 through an atomizing spray nozzle 26 mounted on wall 18 and adapted to be connected to both a supply of compressed air and a supply of such liquid mixture. Preferably the axis of rotation 28 of drum 12 is inclined slightly to the horizontal and slopes downwardly toward the end 20 of contact chamber 10 to assist the finely divided fibers of paper in working their way through rotating drum 12 to be removed from the drum through outlet tube 24. As shown by the arrows in FIG. 2, when contact chamber 10 is in operation, rotation of drum 12 tends to cause the finely divided fibers of paper to travel in a path generally transverse to and across the path of the atomized spray of liquid mixture from nozzle 26.

By way of example and not limitation, paper mulch has been produced in accordance with this invention by contacting about 1,000 pounds per hour of finely divided fibers of wastepaper with a liquid mixture of water, wetting agent, and dye in a contact chamber of the type illustrated in FIGS. 1 and 2 having a drum about 8 feet in diameter and 20 feet long. The drum was rotated at 25 to 35 revolutions per minute with its axis inclined to the horizontal and sloping downwardly toward the discharge end of the contact chamber at an angle of about 2¾° below the horizon. The finely divided fibers of wastepaper were continuously blown into one end of the rotating drum at the rate of about 1,000 pounds of fibers per hour and were intermittently discharged from the other end of the drum in about 35 batches per hour of substantially equal weight. A mixture of water, wetting agent, and dye was continuously injected into the drum through an atomizing spray head at the rate of about 45 gallons per hour. The mixture consisted by weight of about one part Turgitol wetting agent, four parts green dye No. 1295, and 1,595 parts water. After the fibers of paper were tumbled in the contact chamber for an average residence time of about 2 minutes, they were removed from the contact chamber and packaged in 40 pound bags for use as mulch for soil. After the packages of paper mulch have been stored for a period of time, the water used as the solvent or carrier for the wetting agent and dye will partially evaporate so that the mulch may eventually have a moisture content dependent on the humidity and temperature of the room in which the paper mulch is stored.

In use the paper mulch of this invention can be applied to soil in the dry form in which it is packaged or the paper mulch can be mixed with a suspended in a quantity of water and the mixture applied to the soil in a stream or jet to deposit a layer of the paper mulch on the soil. The paper mulch is usually applied to the soil at the rate of 1,200 to 1,600 and preferably about 1,400 pounds per acre. For application onto soil by a stream or jet, the mixture of paper mulch and water can be by weight one part of mulch to each 15 to 25 and preferably about 20 parts of water. If desired, a quantity of fertilizer and grass seed can be added to the mixture of water and paper mulch so that the entire mixture can be simultaneously applied onto the soil by a jet or stream of the mixture. The composition and quantity of fertilizer to be added to the mixture of water and paper mulch is usually determined by the particular soil conditions and the rate of application recommended by the manufacturer of the fertilizer. The type and quantity of grass seed to be added to the mixture of water and paper mulch is usually determined by the particular soil conditions, geographic location, shade conditions, and the type of grass seed and rate of application recommended by the producer of the grass seed.

By way of example and not limitation, a typical mixture of water, fertilizer, paper mulch, and grass seed for application to one acre of soil by a Hydroseeder produced by the Finn Equipment Company is 3,200 gallons of water, 1,400 pounds of paper mulch, 800 pounds of fertilizer, and 200 pounds of grass seed. This entire mixture can be discharged from a nozzle of a Finn Hydroseeder in a stream or jet onto the soil to produce a layer of mulch which contains the grass seed and a quantity of moisture and fertilizer to promote germination of the grass seed. The paper mulch when applied by being mixed with water and discharged in a jet or stream onto the soil tends to become a coagulated or cohesive mass or blanket of fibers which are less likely to be blown away by winds or washed away by rain than is a mulch of sawdust or finely divided wood chips.

I claim:

1. A process of making soil mulch comprising, reducing essentially dry sheet like used paper consisting essentially of wastepaper and used newsprint which is unsaturated with moisture to essentially dry fibers of used paper unsaturated with moisture and with at least 90 percent by weight of the dry fibers having a maximum fiber length not greater than one inch, said reducing of the used paper to dry fibers occurring without contacting the used paper with any aqueous mixture, contacting the dry fibers of used paper with a quantity of a liquid mixture which is not greater than 65 percent by weight of the dry fibers of the use paper and the liquid mixture, said liquid mixture containing a wetting agent which will enhance the ability of the fibers of used paper to be mixed with, suspended in, and absorb water, and said contacting of the liquid mixture and the dry fibers of used paper occurring while the fibers of used paper are suspended in air such that the fibers of used paper take up the liquid mixture and retain the wetting agent without saturating the fibers of used paper with moisture and without agglomerating the fibers of used paper such that the fibers of used paper contacted with the liquid mixture and retaining the wetting agent can be packaged and used as a mulch without any further processing to remove moisture from the fibers of paper and to break up the mass of fibers of used paper contacted with the liquid mixture and retaining the wetting agent.

2. The process of claim 1 wherein said liquid mixture is an aqueous mixture and the quantity of said wetting agent is not greater than 0.04 percent by weight of the dry fibers of used paper.

3. The process of claim 1 which also comprises contacting the fibers of used paper with a quantity of dye which is at least 0.03 percent by weight of the dry fibers of used paper to impart a new and substantially uniform color to the fibers of used paper.

4. The process of claim 1 wherein the liquid mixture comprises water and the quantity by weight of the liquid mixture is not greater than 40 percent by weight of the dry fibers of used paper and the liquid mixture.

5. The process of claim 1 wherein the fibers of used paper are contacted with the liquid mixture at room temperature by tumbling the fibers of used paper at room temperature in a chamber while spraying the liquid mixture into the chamber.

6. The process of claim 5 wherein the chamber comprises a rotating drum having a diameter not greater than one-half of the axial length of the drum, the fibers of used paper are injected into the drum adjacent one end thereof, traverse generally axially of the drum while they are tumbled therein, and after having been contacted with the liquid mixture and traversed generally axially through the drum while being tumbled therein are removed from the drum adjacent the other end thereof.

7. The process of claim 6 wherein the fibers of used paper after having been contacted with the liquid mixture are tumbled in the drum for at least 2 minutes before being removed from the drum.

8. The process of claim 5 wherein said liquid mixture consists essentially of water and a quantity of said wetting agent which is not greater than 0.04 percent by weight of the dry fibers of used paper.

9. The process of claim 8 wherein said liquid mixture also consists of a quantity of dye which is at least 0.03 percent by weight of the dry fibers of used paper, and said dye imparts a different color to the finely divided fibers of used paper.

10. As an article of manufacture a soil mulch comprising, a plurality of essentially dry finely divided fibers of used paper consisting essentially of used newsprint and wastepaper with at least 90 percent by weight of the dry fibers of used paper having a maximum fiber length not greater than one inch, a wetting agent retained by the fibers of used paper and enhancing the ability of the fibers of used paper to mix with, be suspended in and absorb water, and wherein the dry fibers were produced by reducing dry sheet like used paper without contacting the used paper with any aqueous mixture, the dry fibers of used paper were contacted with a quantity of liquid carrying said wetting agent which was not greater than 65 percent by weight of the dry fibers of used paper and the liquid, and the contacting of the dry fibers with the liquid carrying the wetting agent comprised the step of suspending the dry fibers of used paper in air during contacting of the dry fibers with the liquid such that the dry fibers of used paper took up the liquid and retained the wetting agent without becoming saturated with moisture and without becoming agglomerated to thereby provide a soil mulch which could be packaged and used without any further processing to remove moisture from the fibers of used paper contacted with the liquid and to break up the mass of fibers of used paper contacted with the liquid.

11. The soil mulch of claim 10 wherein at least 90 percent by weight of said dry fibers of used paper have a maximum fiber length not greater than about one-half of an inch.

12. The soil mulch of claim 10 wherein said wetting agent consists essentially of a quantity of anionic and ethoxylated surfactants of not more than 0.04 percent by weight of the dry fibers of used paper and said liquid consists essentially of water.

13. The soil mulch of claim 12 which also comprises a quantity of an aniline dye of at least 0.03 percent by weight of the dry fibers of used paper, said dye imparting a different color to said fibers of used paper.

14. The soil mulch of claim 12 wherein the fibers of used paper were contacted with said liquid carrying said wetting agent by tumbling said fibers of used paper while spraying said liquid carrying said wetting agent onto the tumbling fibers of used paper.

* * * * *